United States Patent
Suzuki

[19]

[11] Patent Number: 5,986,689
[45] Date of Patent: *Nov. 16, 1999

[54] FILM TREATING APPARATUS

[75] Inventor: Kenichi Suzuki, Isehara, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/490,246

[22] Filed: Jun. 14, 1995

[30]    Foreign Application Priority Data

Jun. 15, 1994  [JP]  Japan ................................. 6-133132

[51] Int. Cl.⁶ ............................ G03B 42/04; B41J 2/435; G01D 15/24
[52] U.S. Cl. ........................... 347/262; 378/173; 378/182
[58] Field of Search ............................. 347/262; 396/30; 430/580; 378/182, 172, 173, 174; 355/72, 73, 133

[56]    References Cited

U.S. PATENT DOCUMENTS

| | | | |
|---|---|---|---|
| 3,573,849 | 4/1971 | Herriot et al. | 350/6.8 |
| 3,698,804 | 10/1972 | Cranskens et al. | 355/3 |
| 4,165,069 | 8/1979 | Colglazier et al. | 271/162 |
| 4,183,654 | 1/1980 | Waschk et al. | 355/3 |
| 4,236,807 | 12/1980 | Kuehnle | 355/3 |
| 4,531,823 | 7/1985 | Deguchi et al. | 355/3 |
| 4,660,963 | 4/1987 | Stemmle | 355/24 |
| 4,754,293 | 6/1988 | Aizawa et al. | 346/160 |
| 4,835,545 | 5/1989 | Mager et al. | 346/1.1 |
| 4,873,554 | 10/1989 | Greco, Jr. | 355/309 |
| 4,908,520 | 3/1990 | Saotome et al. | 250/327.2 |
| 5,008,694 | 4/1991 | Tajima et al. | 354/277 |
| 5,151,728 | 9/1992 | Hendry et al. | 354/83 |
| 5,619,246 | 4/1997 | Straayer et al. | 347/262 |
| 5,666,595 | 9/1997 | Sameshima et al. | 399/10 |
| 5,678,303 | 10/1997 | Wichmann | 29/806 |

FOREIGN PATENT DOCUMENTS 0346947  12/1989  European Pat. Off. ........ G03B 42/04

*Primary Examiner*—Safet Metjahic
*Assistant Examiner*—Christopher E. Mahoney
*Attorney, Agent, or Firm*—Fitzpatrick, Cella, Harper & Scinto

[57]    ABSTRACT

A film treating apparatus has an apparatus body for executing the treatment of untreated film at a predetermined position, the apparatus body being capable of inserting thereinto and removing therefrom untreated film container containing untreated film therein. A film separating mechanism is provided in the apparatus body, the film separating mechanism taking out sheets of untreated film to be conveyed to the predetermined position one by one from the untreated film container. The film separating mechanism is insertable into and removable from the apparatus body in the same directions as the directions of insertion and removal of the untreated film container with respect to the apparatus body.

21 Claims, 10 Drawing Sheets

CAM GROOVE RADIUS FOR UPPER SLIDE PLATE R1

CAM GROOVE RADIUS FOR LOWER SLIDE PLATE R2

CAM ROTATION ANGLE θ

FILM TREATING APPARATUS

BACKGROUND OF THE INVENTION

1. Field of the Invention

This invention relates to a film treating apparatus for effecting a predetermined treatment on sheet film. This invention can be applied particularly well to a laser imager for recording medical treatment images on sheet film by a laser beam.

2. Related Background Art

In a laser imager for recording on film an image signal obtained in a hospital by the use of a diagnosing apparatus such as CT or MRI, use is often made of an apparatus to which an automatic developing machine is connected and into which recorded film can be automatically fed to thereby carry out a developing process. An example of such an apparatus is shown in FIG. 1 of the accompanying drawings. In FIG. 1, a reference numeral 401 designates a laser imager, a reference numeral 402 denotes an automatic developing machine for developing film recorded by the laser imager 401, a reference numeral 403 designates a conveying portion disposed between the laser imager 401 and the automatic developing machine 402 for conveying the film recorded by the laser imager 401 to a automatic developing machine 402, the reference numeral 404 denotes an optical unit for applying a laser beam to the film in a main scanning direction to thereby effect recording, a reference numeral 405 designates a supply magazine containing a number of sheets of unused film therein, a reference numeral 406 denotes a separating unit for taking out the sheets of film piled in a supply magazine one by one, the reference numeral 407 designates a receive magazine for temporarily containing the recorded film therein, and a reference numeral 408 denotes sub-scanning means for sub-scanning the film taken out of the supply magazine 405 in a direction intersecting the main scanning direction. The supply magazine 405 and the receive magazine 407 are removable in a direction toward this side in FIG. 1. In FIG. 1, the sheets of film taken out one by one by the separating unit 406 are conveyed to the sub-scanning means 408 by conveying means, not shown, and are subjected to sub-scanning there and are subjected to main scanning with a beam of light for recording by the optical unit 404, whereby a two-dimensional image is recorded on the film.

The film on which recording has been effected is conveyed to the automatic developing machine 402 via the conveying portion 403 by conveying means, not shown, and is developed. Alternatively, the film is conveyed to the receive magazine 407 by conveying means, not shown, and recording is effected on a predetermined number of sheets of film, whereafter the sheets of film are taken out and are developed by other automatic developing machine.

The apparatus of FIG. 1, however, suffers from the problem that its installation space becomes large because the laser imager 401 and the automatic developing machine 402 are disposed in parallel with each other.

To avoid this, an arrangement as shown, for example, in FIG. 2 of the accompanying drawings would come to mind wherein the laser imager 401 and the automatic developing machine 402 are vertically stacked. In FIG. 2, the same members as those in the apparatus of FIG. 1 are given the same reference numerals. By adopting such an arrangement, the installation space is reduced. In such an apparatus, however, when the optical unit 404 and the separating unit 406 are to be interchanged or when it becomes necessary to gain access to the interior parts, the automatic developing machine 402 must be removed. The automatic developing machine 402, which contains developing liquid therein, is very heavy and for example, it is difficult for a serviceman to move it. Also, the automatic developing machine 402 has water supply and drain valves connected thereto, and to move it, these valves must be disconnected, which is cumbersome work.

SUMMARY OF THE INVENTION

It is the object of the present invention to provide a film treating apparatus which, even if its installation space is reduced as shown in FIG. 2, will give access to interior parts without cumbersome work and which is easy to operate.

DESCRIPTION OF THE PREFERRED EMBODIMENTS

Figure 1:
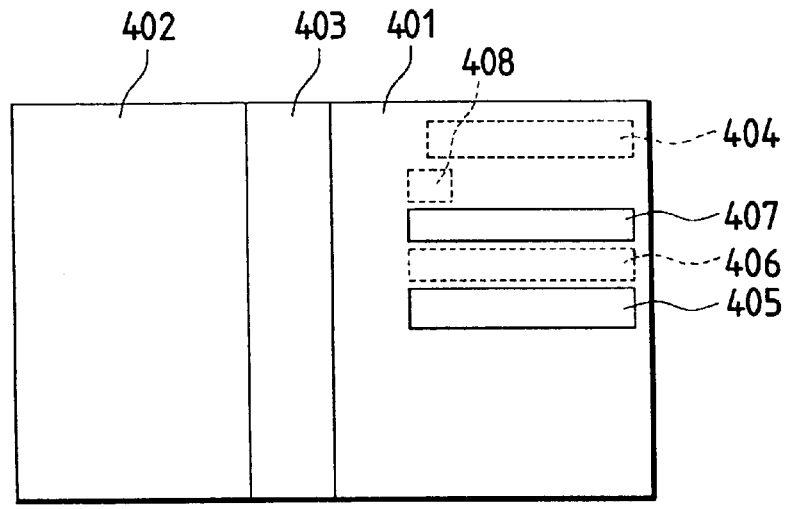
FIG. 1 is an illustration of an example of the prior art.
Figure 2:
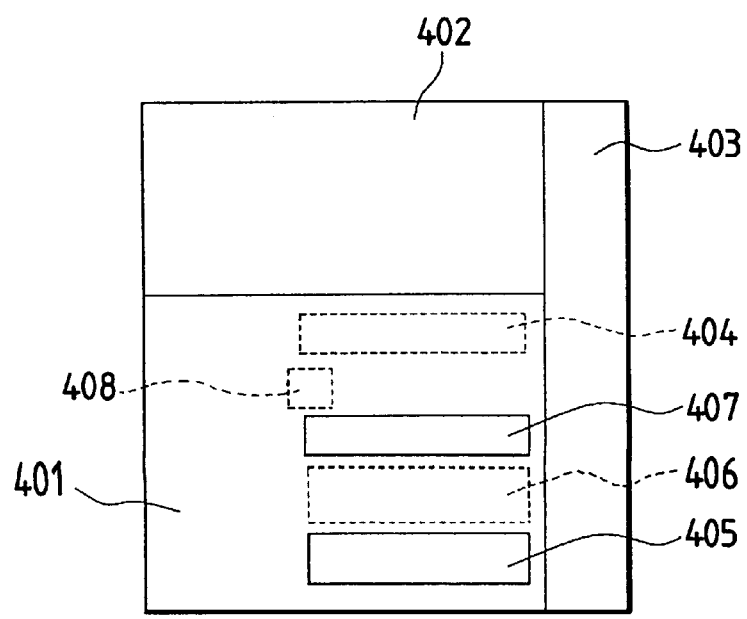
FIG. 2 is an illustration of a modified example of the prior art.
Figure 3:
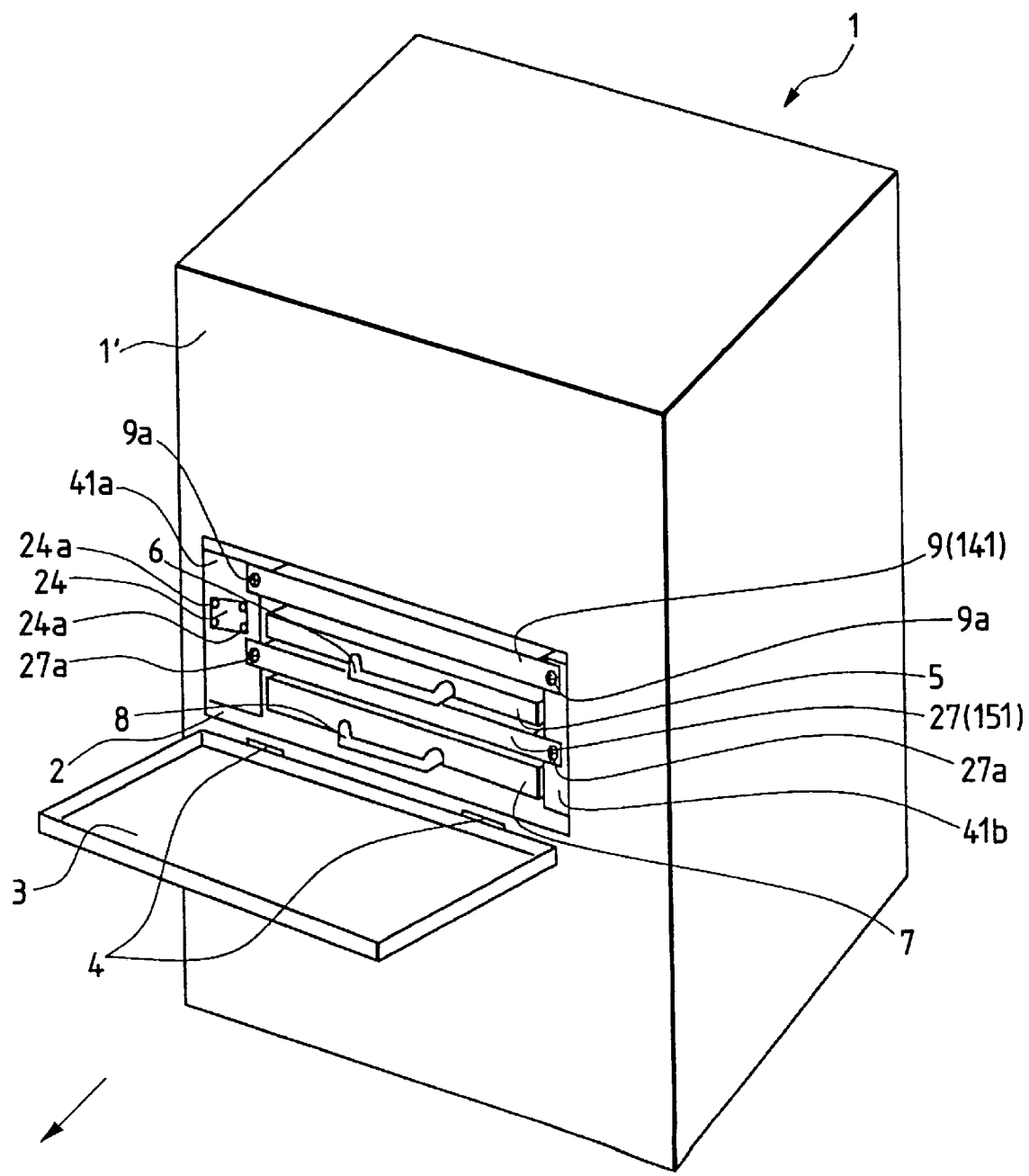
FIG. 3 is a perspective view of an information recording apparatus according to the present invention.
Figure 4:
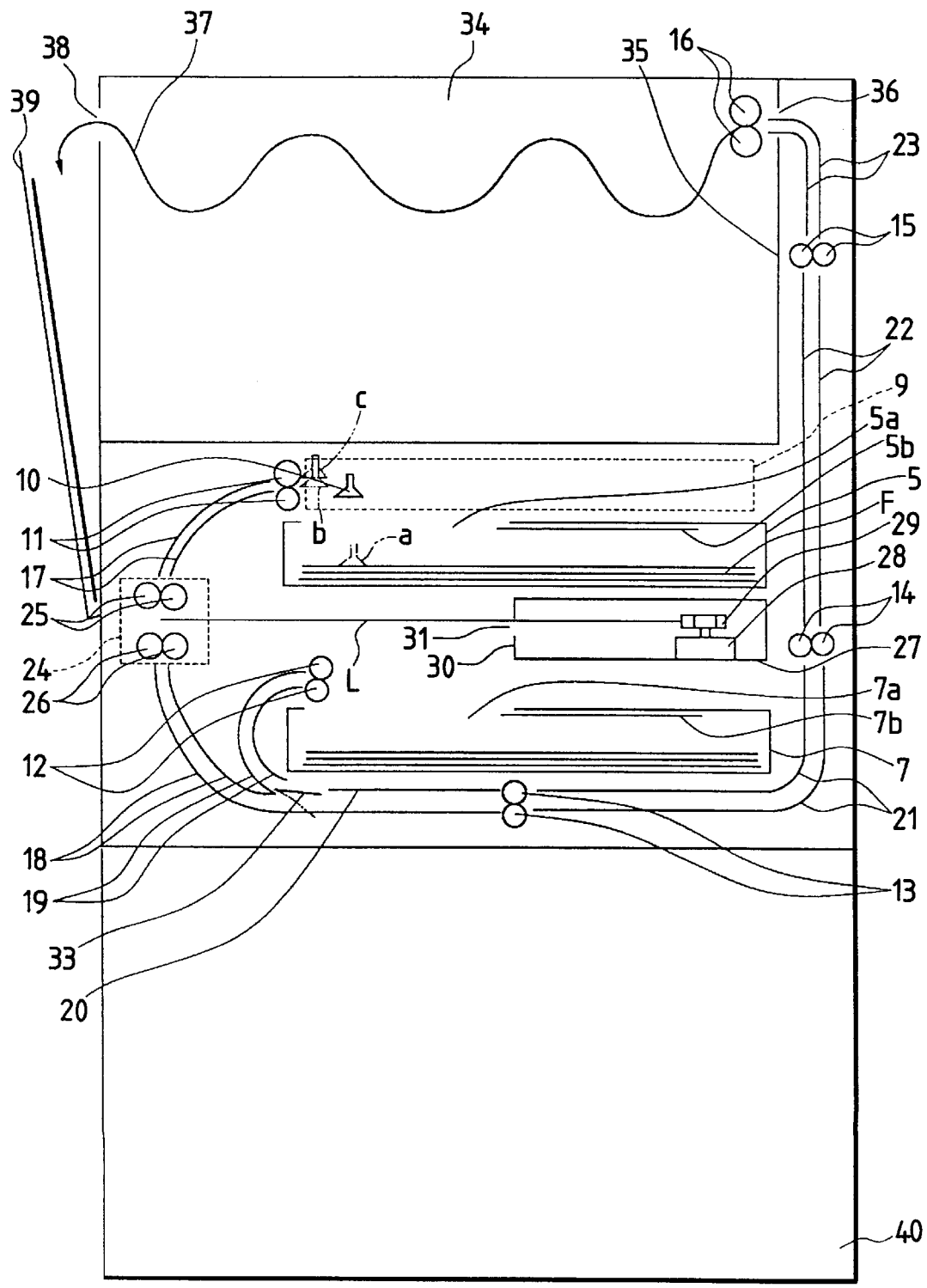
FIG. 4 is a front sectional view of the same apparatus.

FIG. 3 is a perspective view of a recording apparatus according to the present invention, and FIG. 4 is a front sectional view thereof. In these figures, the reference numeral 1 designates a recording apparatus body, and the reference numeral 2 denotes an opening formed in the panel cover 1' of the recording apparatus body 1 and is capable of being light-tightly shielded by a door 3. The door 3 is openably and closably supported by a hinge 4. The reference numeral 5 designates a supply magazine in which sheets of unused film F are piled and contained, the reference numeral 6 denotes the handle of the supply magazine 5, the reference numeral 7 designates a receive magazine in which sheets of recorded film are temporarily piled and contained, and the reference numeral 8 denotes the handle of the receive magazine 7. The two magazines 5 and 7 are provided with openings 5a and 7a through which the film goes in and out, and shutters 5b and 7b of the sliding type capable of light-tightly shielding these openings. With the shutters closed, the two magazines are removably mountable with respect to the apparatus in the direction of arrow in FIG. 3. Also, with the two magazines mounted with respect to the apparatus, the shutters are openable and closable by driving means, not shown. The reference numeral 9 designates a separating unit comprised of a sucker 10 for separating and sucking sheets of film one by one, driving means, not shown, for moving the sucker to positions a, b and c, support means and link means, not shown. These members, not shown, will be described later in detail.

The reference numerals 11–16 denote pairs of rollers for conveying the film while interposing the film between there, the reference numerals 17–23 designate guide means for forming, in pairs or singly, a passageway for the film and guiding the film, and the reference numeral 24 denotes a sub-scanning unit including a pair of sub-scanning rollers 25 and 26 rotated at a predetermined speed of high accuracy and executing the sub-scanning of the film. The reference numeral 27 designates an optical unit, and a polygon mirror 29 for scanning a beam of light is mounted on a motor 28. The reference numeral 30 denotes a cover formed with an opening 31 through which scanning light 32 may pass. The beam of light is adapted to be applied to between the sub-scanning rollers 25 and 26, and at this position, the recording operation is performed on the film.

The reference numeral 33 designates a changeover guide for changing over the direction of movement of the film, and this changeover guide 33 is movable to its solid-line position and its dots-and-dash line position by driving means, not shown. A plurality of such changeover guides 33 are provided divisionally in the direction of depth of FIG. 4. The guide 18 is formed with a cut-away so as not to interfere with the changeover guides 33. The reference numeral 34 denotes a developing portion for developing the film on which recording has been done. The developing portion 34 is partitioned by a partition 35. The reference numeral 36 designates an opening through which the film may pass.

The reference numeral 37 denotes a passageway for the film. Although not shown in detail, as in an ordinary automatic developing machine, the passageway 37 is comprised of rollers, a guide, etc. The reference numeral 38 designates an opening formed in the cover. The film may pass through the opening 38, and the developed film may be discharged through this opening 38 into a tray 39. The reference numeral 40 denotes a stand for facilitating the mounting and dismounting of the magazines. An electrical control unit, a storage tank for developing liquid, etc. are contained in the stand 40.

The reference characters 41a and 41b designate frames to which the separating unit 9, the sub-scanning unit 24 and the optical unit 27 are fixed as shown in FIG. 3. Further, the separating unit 9, the sub-scanning unit 24 and the optical unit 27 can be removably mounted in the direction of arrow in FIG. 3 by removing fixing screws 9a, 27a and 24a.

The operation of this apparatus will now be described. The door 3 is opened, the two magazines are inserted into the apparatus, the door 3 is closed and recording is indicated by indicating means, not shown, whereupon the shutters 5b and 7b are opened and the sucker 10 is moved to the position a and sucks a sheet of film F, and then the sucker 10 is moved to its solid line position and the position b and causes the film to be nipped between the rollers 11. The rollers 11 are then rotated to cause the film to be nipped between the sub-scanning rollers 25. The rollers 25 and 26 then begin to be rotated and at the same time, the optical unit starts main scanning. Thereby, a two-dimensional image is recorded on the film. Before the recording is terminated and the film leaves the rollers 26, the optical unit terminates the main scanning, thus terminating the recording. The rollers 13 then begin to be rotated and feeds the film until the trailing end of the film passes the changeover guide 33. When the recorded film is to be directly fed to the developing portion, the film is intactly fed to the developing portion by the rollers 14–16, and is developed and discharged into the tray 39. When the recorded film is to be fed into the receive magazine as when the developing portion gets out of order, the changeover guide 33 is changed over after the trailing end of the film has passed the changeover guide 33, and the rollers 13 are rotated in the reverse direction, and the rollers 12 begin to be rotated to thereby feed the film into the receive magazine 7.

Figure 5:
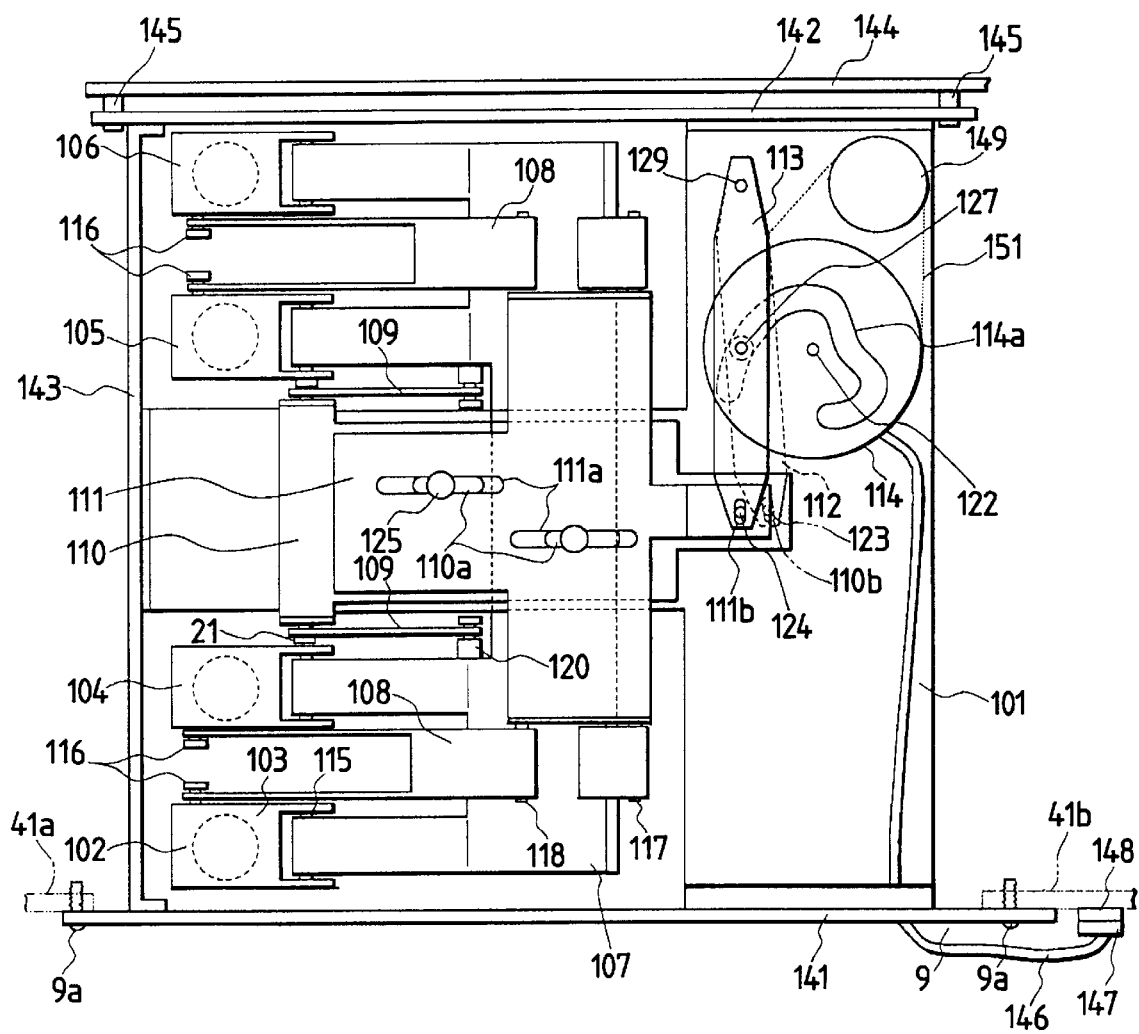
FIG. 5 is a fragmentary detailed view of the same apparatus (a top plan view of a separating unit).
Figure 6:
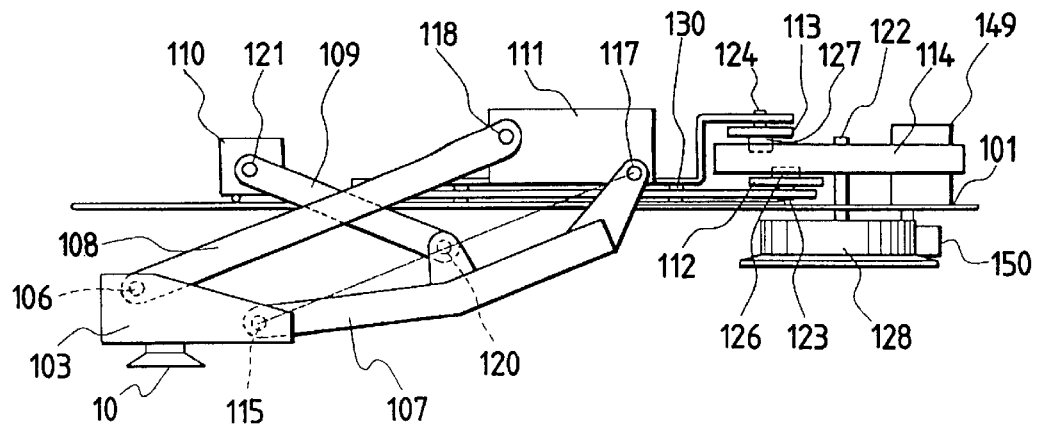
FIG. 6 is a fragmentary detailed view of the same apparatus (a front sectional view of the separating unit).

FIGS. 5 and 6 are detailed views of the separating unit 9, FIG. 5 being a top plan view, and FIG. 6 being a front sectional view. In these figures, the reference numeral 101 designates a base plate holding the various components of a sheet supply apparatus. The sucker 10 has its exhaust port, not shown, connected to pressure reducing means such as an electromagnetic pump by a hose, not shown, and can reduce its internal pressure when it comes into contact with a sheet, and can suck and hold the sheet. The sucker 10 is fixed to sucker supporting members 103, 104, 105 and 106. The lower ends of arms 107 and 108 are pivotably fixed to the sucker supporting members 103, 104, 105 and 106 by pins 115 and 116. The upper ends of the arms 107 and 108 are fixed to an upper slide plate 111 by pins 117 and 118. The spacing between the pins 115 and 117 and the spacing between the pins 116 and 118 are equal to each other. Also, the spacing between the pins 115 and 116 and the spacing between the pins 117 and 118 are equal to each other. That is, the sucker supporting member 103, the arms 107, 108 and the upper slide plate 111 together constitute a parallelogrammatic link mechanism. Consequently, even though the arms 107 and 108 are rotated, the sucker 10 always keeps itself horizontal relative to the base plate 1. The reference numeral 109 designates an arm having its lower end pivotably fixed to the arm 107 through a pin 120 and having its upper end pivotably fixed to a lower slide plate 110 through a pin 121. The location of the pin 120 is an intermediate point on a straight line linking the pins 115 and 117 together, and the spacing between the pins 120 and 121 is equal to ½ of the spacing between the pins 115 and 117. The lower slide plate 110 is formed with two slots 110a, and the upper slide plate 111 is also formed with similar slots 111a. Pins 125 extend through the slots 110a and 111a. Spacers 130 excellent in slidability are disposed in the portion of contact between the base plate 101 and the lower slide plate 110 and the portion of contact between the lower slide plate 110 and the upper slide plate 111. Consequently, the lower and upper slide plates 110 and 111 are fixed to the base plate 101 independently for sliding movement to right and left as viewed in FIG. 6. Slots 110b and 111b are formed in the right end portions of the slide plates 110 and 111, respectively, and pins 123 and 124 fixed to the lower ends of levers 112 and 113, respectively, are restrained in those slots. The levers 112 and 113 are fixed to the base plate 101 independently for pivotal movement about a shaft 129. The reference numeral 114 denotes a cam disc fixed to the base plate 101 for pivotal movement about a shaft 122. A cam groove 114a is formed in the upper surface of the cam disc 114, and a cam follower 127 fixed to the lever 113 is fitted in this cam groove. Another cam groove is formed in the lower surface, not shown, of the cam disc 114, and a cam follower 126 fixed to the lever 112 is fitted in this cam groove. A toothed pulley 128 is fixed to the lower end of the shaft 22. A toothed belt, not shown, is passed over the toothed pulley 128, and can receive a drive force from a drive source to be described which is controlled by a control circuit, not shown, to thereby rotate a rotary shaft and thus the cam disc.

The reference numeral 149 designates a motor, and the reference numeral 150 denotes a toothed pulley which is fixedly mounted on the shaft of the motor and over which a toothed belt 151 is passed. The reference numerals 141, 142 and 143 designate frames connected to the base plate 101 and connected to one another as shown. In FIG. 5, the lower side is the front side of the apparatus. The reference character 9a denotes screws for fixing the frame 141 to frames 41a and 41b. The reference numeral 144 designates a frame on the inner side of the apparatus. The reference numeral 145 denotes projections provided on the frame 144, and these projections are adapted to fit in holes formed in the corresponding portions of the frame 142. The reference numeral 146 designates a cable having a connector 147 attached to one end thereof. The connector 147 is adapted to fit to a connector 148 fixed to the frame on this side of the apparatus. The connectors are connected to control means, not shown. With the above-described construction, the separating unit 9 can be pulled out in the direction of arrow in FIG. 3 by removing the screws 9a and the connector 147. Also, the separating unit 9 can be inserted in a direction opposite to the direction of arrow and be fixed in place by being fixed by the screws 9a.

Figure 10:
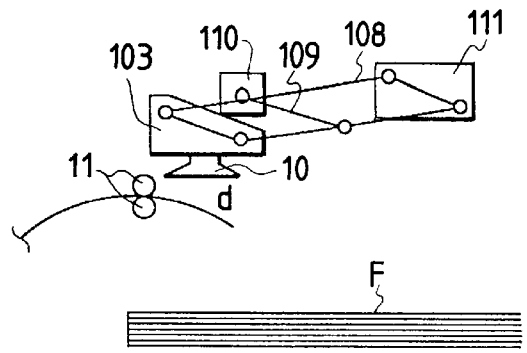
FIG. 10 illustrates the operation of the separating unit.

Mounting and dismounting are effected with the sucker being in the position of FIG. 10 which will be described later.

With the construction as described above, when the lower slide plate 110 is fixed and the upper slide plate 111 is slid in the right to left direction as viewed in FIG. 6, the sucker 10 is moved only vertically in FIG. 6. When the lower slide plate 110 and the upper slide plate 111 are moved at a time in the same direction as if they were a unit, the sucker 110 is moved only in the right to left direction as viewed in FIG. 6. When the upper slide plate 111 is fixed and the lower slide plate 110 is slid, the arm 107 is rotated about the pin 117 and the sucker 10 is moved describing an arcuate locus while keeping itself horizontal. Also, by the lower and upper slide plates 110 and 111 being moved at different speeds, the horizontal position of the sucker 10 can also be changed while the sucker 10 is moved vertically in FIG. 6.

Figure 11A:
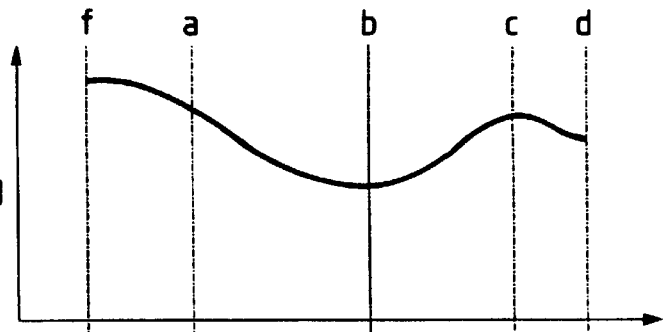
FIG. 11 is an illustration of cam grooves.
Figure 11B:
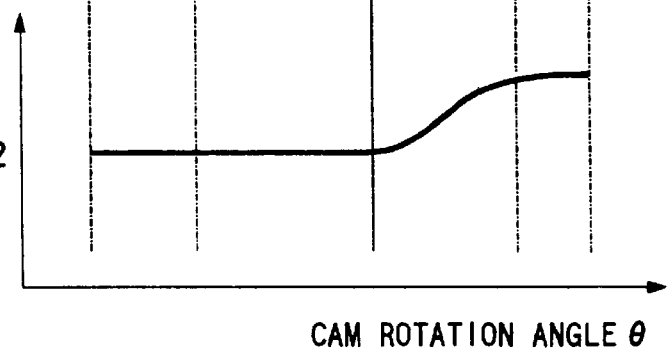

Such movement of the sucker is determined by the shapes of the cam grooves formed in the front and back surfaces of the cam disc which moves the slide plates. So, an example of the shapes of the cam grooves and the operation of the sucker will now be described with reference to FIGS. 7 to 11. FIGS. 7 to 10 are schematic views representing an example of the operation of the embodiment shown in FIGS. 5 and 6, and the arms are depicted in simplified forms, but the same reference numerals represent the same members. The reference numeral 11 designates a pair of conveying rollers, and the letter F denotes piled sheets. FIG. 11 shows the relations between the radii R1 and R2 of the cam grooves at the locations whereat the cam followers 127 and 126 of the upper and lower slide plates 111 and 110, respectively, are positioned and the rotation angle θ of the cam disc 114. Dot-and-dash lines in FIG. 11 indicate the rotation angles of the cam disc corresponding to the positions f, a, b, c and d of the sucker shown in FIGS. 7 to 10.

Figure 7:
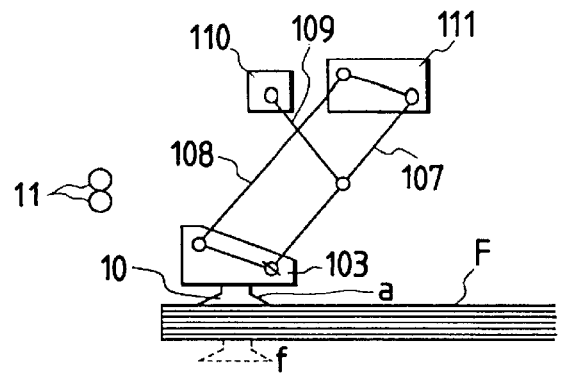
FIG. 7 illustrates the operation of the separating unit.
Figure 8:
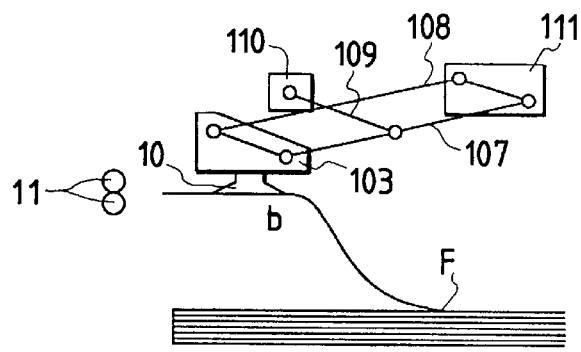
FIG. 8 illustrates the operation of the separating unit.

At the position a in FIG. 7, the sucker 10 is in contact with the uppermost one of the piled sheets F. In this state, the interior of the sucker is reduced in pressure by pressure reducing means, not shown, to thereby suck and hold the sheet. When from the state a, the cam disc 114 is rotated in a direction in which the rotation angle e thereof becomes greater (a counter-clockwise direction in FIG. 5) as shown in FIG. 11 to thereby decrease only the cam groove radius R1 at the cam follower position of the upper slide plate 111, the sucker 10 moves up and the leading end of the sucked sheet moves up to the position b (FIG. 8) which is at the same level as the nip portion of the pair of conveying rollers 11.

Figure 9:
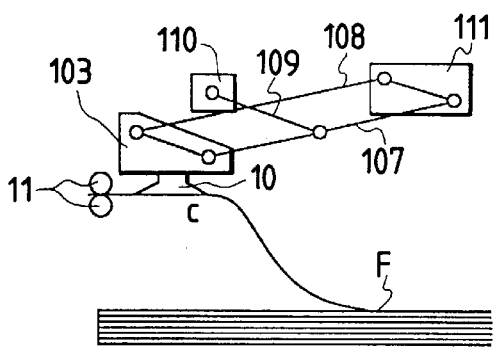
FIG. 9 illustrates the operation of the separating unit.

When as shown in FIG. 11, the cam disc 114 is further rotated and thereby shifted from the position b to the position c, the cam groove radii R1 and R2 at the cam follower position of the upper and lower slide plates increase by the same amount. At this time, the sucker 10 moves leftwardly horizontally to the position c and inserts the leading end of the sheet into the nip portion of the pair of conveying rollers 11 (FIG. 9). The pressure reduction by the pressure reducing means is then released to thereby increase the pressure in the sucker, and as shown in FIG. 11, the cam disc 114 is further rotated to thereby decrease R1 only, and the sucker 10 is moved up from the position c to the position d at desired timing, whereby it is retracted from the sheet conveyance path (FIG. 10).

After a sheet has been conveyed, the cam disc is reversely rotated and returned to near the position a in FIG. 11, whereby the sucker is moved to the position at which it comes into contact with the uppermost one of the piled sheets F. Also, the sucker 10 can be moved down to the position f lower than the position a and can sufficiently cover any difference in the number of piled sheets. The timing at which the sucker is moved down and comes into contact with the sheet to thereby such the sheet and thereafter is moved up is attained by controlling the drive so that the cam disc 114 may be reversely rotated at a point of time whereat the contact of the sucker with the sheet has been detected by detecting means, not shown. At the same time, the means for reducing the pressure in the sucker is operated. The above-described control of the rotation of the cam disc 114 and the control of the means for reducing the pressure in the sucker are effected by a control circuit, not shown.

Figure 12:
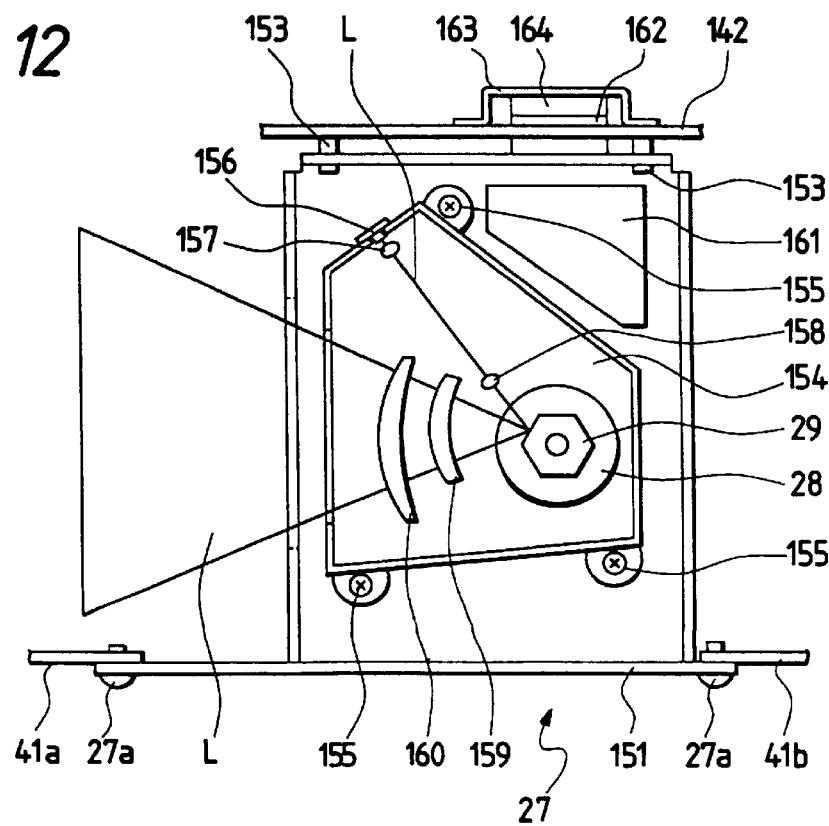
FIG. 12 is a fragmentary detailed view of the same apparatus (a top plan view of an optical unit).

FIG. 12 is a detailed view of the optical unit 27 as it is seen from above it. In FIG. 12, the reference numeral 151 designates a frame of which the flat circumference is bent so as to form walls. The reference character 27a denotes screws for fixing the frame 151 to frames 41a and 41b. The reference numeral 153 designates projections provided on a frame 142 and inserted in apertures formed in the inner side wall of the frame 151. The reference numeral 154 denotes a box-like member fixed to the frame 151 by screws 155 and made by casting or plastic molding and having optical parts disposed therein. Lenses 157 and 158 for converting a laser beam L modulated in conformity with image data to be recorded into a predetermined characteristic and a polygon mirror 29 rotatable at a predetermined rotational speed by a motor 28 are arranged in succession. Further, the laser beam L reflected by the polygon mirror 29 may pass through lenses 159 and 160, whereafter it may be sectorally scanned between the pairs of sub-scanning rollers 25 and 26 in FIG. 4 and be applied to the film. The reference numeral 161 designates a print base plate for effecting the control of the laser. The reference numerals 162 and 164 denote connectors fixed to the frame 151 and a bracket 163, respectively, fixed to the frame 142.

With the above-described construction, the optical unit 27, as a whole, can be drawn out in the direction of arrow in FIG. 3 by removing screws 152, and can be inserted in a direction opposite to the direction of arrow and be fixed in place relative to the apparatus by fixing the screws 152. In this case, the connectors 162 and 164 are adapted to automatically fit and come off with the mounting and dismounting operations.

Figure 13:
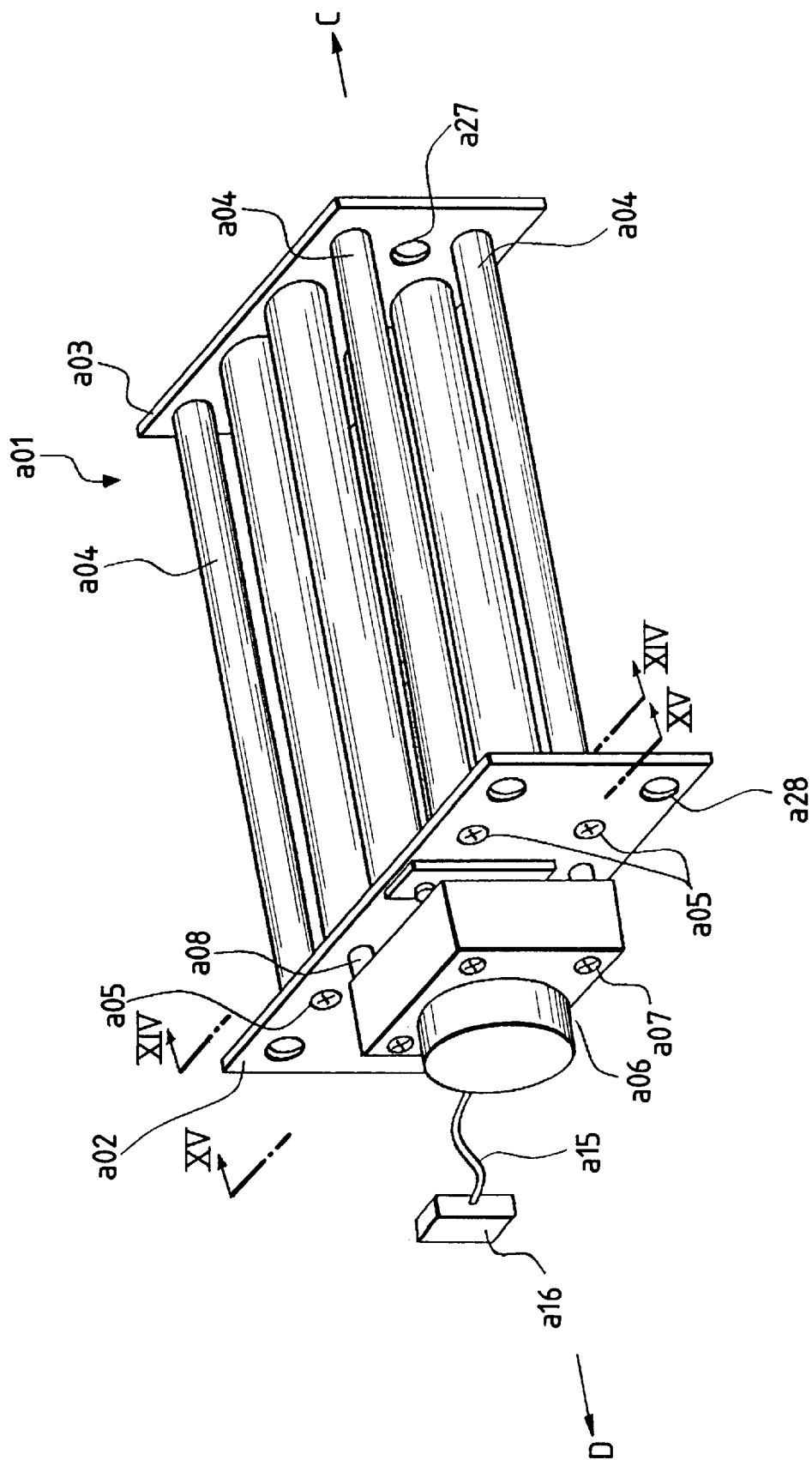
FIG. 13 is a fragmentary detailed view of the same apparatus (a perspective view of a sub-scanning unit).
Figure 14:
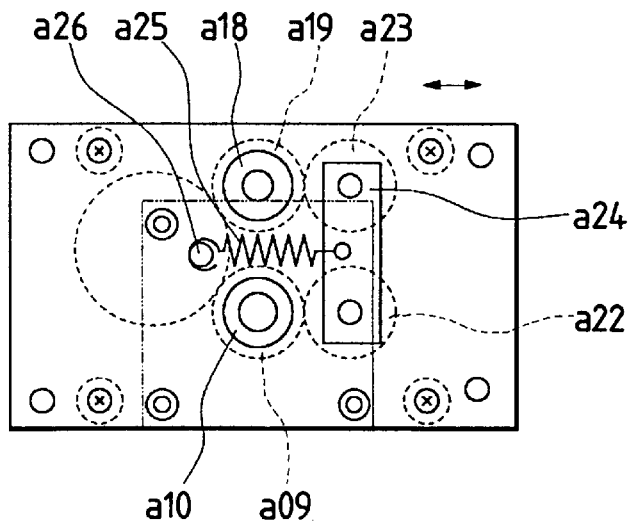
FIG. 14 is a fragmentary detailed view of the same apparatus (a front sectional view of the sub-scanning unit).
Figure 15:
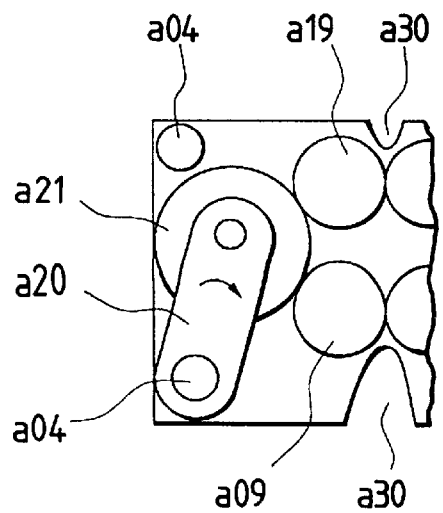
FIG. 15 is a fragmentary detailed view of the same apparatus (a front sectional view of the sub-scanning unit).
Figure 16:
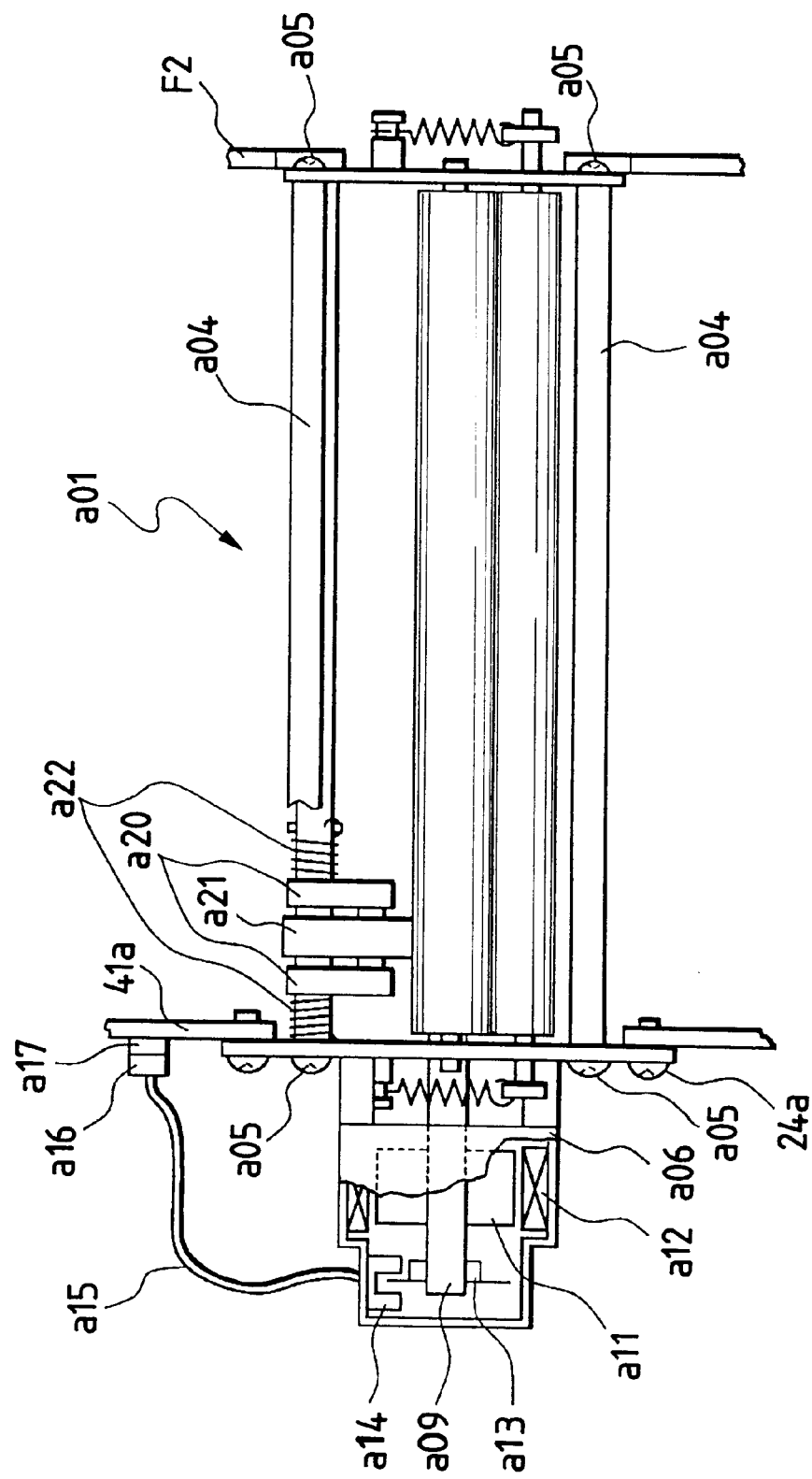
FIG. 16 is a fragmentary detailed view of the same apparatus (a front sectional view of the sub-scanning unit).

FIG. 13 is a pictorial perspective view of the sub-scanning unit, FIGS. 14 and 15 are views showing the cross-sections XIV—XIV and XV—XV, respectively, of FIG. 13, and FIG. 16 is a top plan view of said unit.

In these figures, the reference character a01 designates the sub-scanning unit, and the reference characters a02 and a03 denote side plates on this side and the inner side connected to each other by four bars a04. The reference character a05 designates screws for fixing the side plates and the bars. The reference character a06 denotes a sub-scanning motor fixed to the side plate a02 by screws a07. The reference character a08 designates a spacer for mounting the motor at a distance from the side plate a02. In this gap, there are disposed a lever and a spring which will be described later. The reference character a09 denotes a roller having its opposite ends rotatably mounted on the side plates through bearing a10 and constructed integrally with the shaft of the motor as shown in FIG. 16. The reference character a11 designates the rotor of the motor fixed to the shaft, the reference character a12 denotes the stator of the motor, the reference character a13 designates the rotor of an optical type encoder fixed to the shaft, and the reference character a14 denotes the detecting portion of the encoder.

The reference characters 41a and F2 designate the frames of the apparatus body. The reference character a17 denotes a connector fixed to the frame 41a and connected to control means, not shown. The reference character a15 designates a cable having a connector a16 provided on one end thereof. The connector a16 is adapted to fit to the connector a17.

The reference character a19 denotes a roller having its opposite ends rotatably supported on the side plates through bearings a18. The reference character a20 designates a lever rotatably supported on the bar a04 and having a roller a21 rotatably mounted on the other end thereof. The lever a20 is biased in the direction of arrow in FIG. 15 by a spring a22. Thereby the rotation of the roller a09 may be transmitted to the roller a19. The reference characters a22 and a23 denote rollers having their opposite ends rotatably supported on the side plates and supported for movement only in the direction of arrow in FIG. 14. The opposite ends of the rollers a22 and a23 extend through the side plates and the outside thereof is engaged by a regulating plate a24 in the form of coupling the two rollers together. The rollers a19 and a23 together constitute the pair of sub-scanning rollers 25, and the rollers a09 and a22 together constitute the pair of sub-scanning rollers 26. One end of a spring a25 is secured to the center of the regulating plate a24 and the other end of the spring is secured to a projection a26 on the side plate so that the rollers a22 and a23 may be biased toward the rollers a09 and a18. Thereby the rotation of the rollers a09 and a18 may be transmitted to the rollers a22 and a23. The reference character a27 designates an aperture formed in the side plate on the inner side. When the unit is mounted on the body as will be described later, the aperture a27 may be engaged by the projection provided on the frame F2 to thereby fix the side plate a27 in place.

The reference character a28 denotes an aperture formed in the side plate on this side for fixing the unit to a frame F1 by the aforementioned screws 24a. The reference character a30 designates a cut-away for preventing the unit from interfering with film guide means mounted on the frame when the unit is mounted on the frame.

With the above-described construction, the unit is integrally mounted on the apparatus body in the direction of arrow C in FIG. 13 and fixed. The connector a16 is then connected to the connector a17, and when a switch, not shown, is closed, the shaft (roller a09) of the motor begins to rotate. The rotation of the roller a09 is transmitted to the roller a18 by the roller a21, and the rotation of the rollers a09 and a18 is transmitted to the rollers a22 and a24. The rotation of the roller a19 is detected by the encoder and is controlled by a servo circuit, not shown, so that the roller a19 is rotated highly accurately at an equal speed. The film is fed into it from the upper side of FIG. 14 and is nipped between the rollers a19 and a23, whereupon the film is downwardly fed at an equal speed, and then the leading end of the film is also nipped between the rollers a09 and a22, and the film is continuedly fed downwardly while being nipped between the four rollers, and sub-scanning is executed. When the unit is to be removed, the connector a16 is disconnected from the connector a17 and the screw a29 is removed, and the unit is pulled out in the direction of arrow D in FIG. 13.

As described above, the separating unit 9, the sub-scanning unit 24 and the optical unit 27 are made insertable and removal in the same directions as the directions in which the supply magazine 5 containing sheets of unused film F therein and the receive magazine 7 temporarily containing sheets of recorded film therein are inserted and removed and therefore, access can be made from the same directions as the directions of insertion and removal of the supply magazine 5 and the receive magazine 7 generally designed for easy access in such as apparatus, and the inserting and removing operations becomes easy even in an apparatus wherein the developing portions 34 is disposed in the upper portion. Particularly, design is made such that these units can be inserted and removed through the opening 2 for the insertion and removal of the supply magazine 5 and the receive magazine 7 which is formed in the panel cover 1' of the recording apparatus body 1 and therefore, the apparatus construction is not complicated and the operations can be performed through one and the same opening and thus, become easy.

Figure 17:
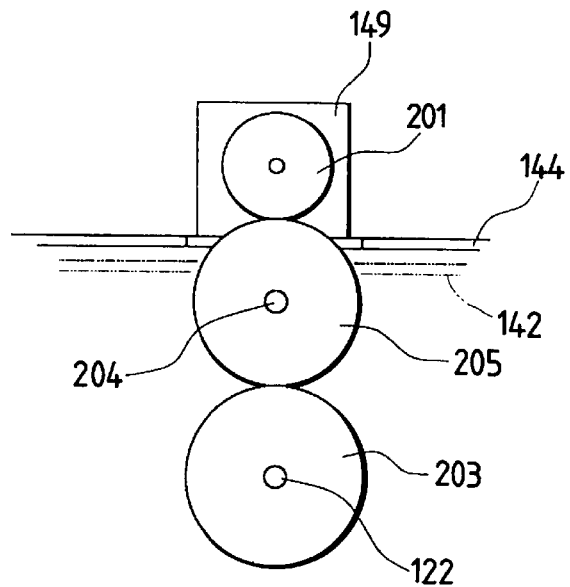
FIG. 17 is a fragmentary detailed view of a modification.

FIG. 17 shows a modification of the unit of FIGS. 5 and 6, and shows a cross-section taken in the direction of arrow in FIG. 6. A motor 149, in this embodiment, is mounted on a frame 144 on the inner side of the apparatus. The reference numeral 201 designates a gear mounted on the shaft of the motor 149, the reference numeral 203 denotes a gear mounted on a shaft 122, the reference numeral 204 is a projection provided on a base board 101 and having a gear 205 rotatably mounted thereon, and the gears 203, 205 and 201 are in meshing engagement with one another so as to transmit the drive force of the motor 149 to the shaft 122. When the separating unit is to be removed, the meshing engagement between the gears 205 and 201 is automatically released, and then the separating unit is to be mounted, the gears 205 and 201 automatically come into meshing engagement with each other.

Figure 18:
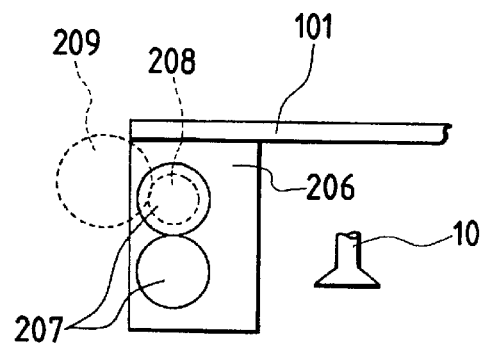
FIG. 18 is a fragmentary detailed view of a modification.

FIG. 18 shows another modification. In this modification, the base board 101 is extended toward the left side, and a rising portion 206 is provided on this side and the inner side, and a roller 207 having its opposite ends rotatably supported is mounted on this rising portion. The reference numeral 208 designates a gear fixed to the inner side of the roller 207, and the reference numeral 209 denotes a gear mounted on a frame on the inner side of the body. The gears 208 and 209 are in meshing engagement with each other, whereby the roller is rotated by driving means, not shown, mounted on the apparatus body. The roller is mounted and dismounted with respect to the apparatus body integrally with the separating unit. When the separating unit is removed, the meshing engagement between the gears 208 and 209 is automatically released, and when the separating unit is mounted, the gears 208 and 209 automatically come into meshing engagement with each other.

Figure 19:
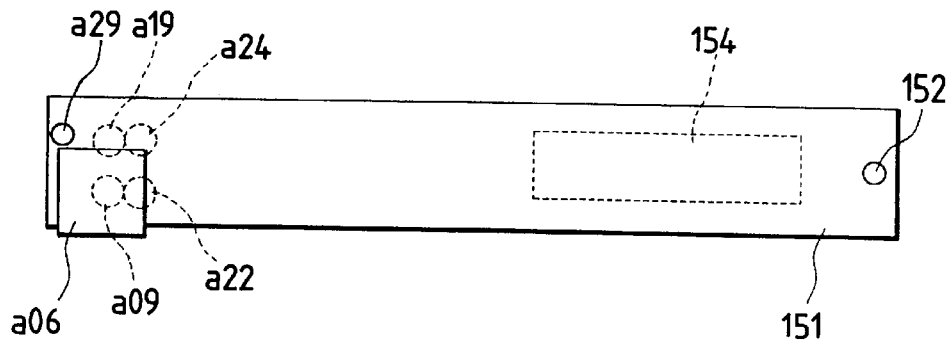
FIG. 19 is a fragmentary detailed view of a modification.

FIG. 19 shows a modification of the optical unit of FIG. 12. In this modification, a frame 151 is extended toward the left side and becomes integral with a side plate a02 on this side. In this modification, the optical unit and the sub-scanning unit are mounted and dismounted as a unit with respect to the apparatus body.

There is also a modification in which only one of the separating unit, the optical unit and the sub-scanning unit is insertable and removable in the same directions as the directions of insertion and removal of the supply magazine and the receive magazine.

According to the above-described embodiments, the film separating mechanism is made insertable and removable as a unit in the directions of insertion and removal of the untreated film containing means and therefore, the insertion and removal of and access to the film separating mechanism become easy and the labor for the maintenance of the film separating mechanism including parts which often require maintenance is greatly improved.

Also, the optical scanning mechanism is made insertable and removable as a unit in the directions of insertion and removal of the untreated film containing means and therefore, the insertion and removal of and access to the optical scanning mechanism become easy and the labor for the maintenance of the optical scanning mechanism including parts which often requires maintenance is greatly improved.

Also, the sub-scanning mechanism is made insertable and removable as a unit in the directions of insertion and removal of the untreated film containing means and therefore, the insertion and removal of and access to the sub-scanning mechanism become easy and the labor for the maintenance of the sub-scanning mechanism including parts which often require maintenance is greatly improved.

Also, such mechanisms insertable and removable as a unit can be inserted and removed through the opening for the insertion and removal of the untreated film containing means and therefore, the construction of the apparatus becomes simplified and the maintenance of the apparatus becomes simple.

Further,the untreated film containing means can also be inserted and removed in the same directions, and this leads to the realization of an apparatus easier to operate.

What is claimed is:

1. A film treating apparatus comprising:
    an apparatus body for executing treatment of untreated film at a predetermined position, said apparatus body being capable of inserting thereinto and removing therefrom untreated film containing means containing untreated film therein; and
    a film separating mechanism provided in said apparatus body, said film separating mechanism separating one of the untreated films in said untreated film containing means from the rest of the untreated films and taking the one out from said untreated film containing means to convey the one to said predetermined position, said film separating mechanism being provided separately from said untreated film containing means, said film separating mechanism having a sucker for sucking the untreated films and a driving mechanism for moving the sucker,
    wherein said film separating mechanism is insertable into, and removable, independently of said untreated film containing means, from said apparatus body in the same direction as the direction of insertion and removal of said untreated film containing means with respect to said apparatus body, said film separating mechanism being insertable and removable without removing any other members in said apparatus body.

2. The apparatus according to claim 1, wherein said apparatus body effects information recording as said treatment on the untreated film at said predetermined position.

3. The apparatus according to claim 2, further having developing means for developing the film on which said recording has been effected, said developing means being disposed in the upper portion of said apparatus body.

4. The apparatus according to claim 1, wherein said apparatus body is further capable of inserting thereinto and removing therefrom treated film containing means containing therein film on which said treatment has been effected, and the directions of insertion and removal of said treated film containing means are the same as the directions of insertion and removal of said untreated film containing means.

5. The apparatus according to claim 1, wherein said apparatus has an opening for the insertion and removal of said untreated film containing means, and said separating mechanism is insertable into and removable from said apparatus body through said opening.

6. A film treating apparatus comprising:
    an apparatus body for executing treatment of untreated film at a predetermined position, said apparatus body being capable of inserting thereinto and removing therefrom untreated film containing means containing untreated film therein; and
    an optical scanning mechanism provided in said apparatus body, said optical scanning mechanism effecting light beam scanning for film treatment on the untreated film conveyed to said predetermined position, said optical scanning mechanism having a light source for providing a light beam for light beam scanning,
    wherein said optical scanning mechanism is insertable into, and removable, independently of said untreated film containing means, from said apparatus body in the same direction as the direction of insertion and removal of said untreated film containing means with respect to said apparatus body, said optical scanning mechanism being insertable and removable without removing any other members in said apparatus body.

7. The apparatus according to claim 6, wherein said apparatus body effects information recording by light beam scanning as said treatment on the untreated film at said predetermined position.

8. The apparatus according to claim 7, further having developing means for developing the film on which said recording has been effected, said developing means being disposed in the upper portion of said apparatus body.

9. The apparatus according to claim 6, wherein said apparatus body is further capable of inserting thereinto and removing therefrom treated film containing means containing therein film on which said treatment has been effected, and the directions of insertion and removal of said treated film containing means are the same as the directions of insertion and removal of said untreated film containing means.

10. The apparatus according to claim 6, wherein said apparatus body has an opening for the insertion and removal of said untreated film containing means, and said optical scanning mechanism is insertable into and removable from said apparatus body through said opening.

11. A film treating apparatus comprising:

an apparatus body for executing treatment of untreated film at a predetermined position, said apparatus body being capable of inserting thereinto and removing therefrom untreated film containing means containing untreated film therein;

an optical scanning mechanism provided in said apparatus body, said optical scanning mechanism effecting light beam scanning for film treatment on the untreated film conveyed to said predetermined position said optical scanning mechanism having a light source for providing a light beam for light beam scanning;

a sub-scanning mechanism for executing sub-scanning on the untreated film light-beam-scanned by said optical scanning mechanism, in a direction intersecting the light beam scanning direction;

wherein said sub-scanning mechanism is insertable into, and removable, independently of said untreated film containing means, from said apparatus body in the same direction as the direction of insertion and removal of said untreated film containing means with respect to said apparatus body, said sub-scanning mechanism being insertable and removable without removing any other members in said apparatus body.

12. The apparatus according to claim 11, wherein said apparatus body effects information recording by light beam scanning as said treatment on the untreated film at said predetermined position.

13. The apparatus according to claim 12, further having developing means for developing the film on which said recording has been effected, said developing means being disposed in the upper portion of said apparatus body.

14. The apparatus according to claim 11, wherein said apparatus body is further capable of inserting thereinto and removing therefrom treated film containing means containing therein film on which said treatment has been effected, and the directions of insertion and removal of said treated film containing means are the same as the directions of insertion and removal of said untreated film containing means.

15. The apparatus according to claim 11, wherein said apparatus body has an opening for the insertion and removal of said untreated film containing means, and said sub-scanning mechanism is insertable into and removable from said apparatus body through said opening.

16. A film treating apparatus comprising:

an apparatus body for executing the treatment of untreated film at a predetermined position, said apparatus body being capable of inserting thereinto and removing therefrom untreated film containing means containing untreated film therein;

a film separating mechanism provided in said apparatus body, said film separating mechanism separating one of the untreated films in said untreated film containing means from the rest of the untreated films and taking the one out from said untreated film containing means to convey the one to said predetermined position, said film separating mechanism being provided separately from said untreated film containing means, said film separating mechanism having a sucker for sucking the untreated films and driving mechanism for moving the sucker;

an optical scanning mechanism provided in said apparatus body, said optical scanning mechanism effecting light beam scanning for film treatment on the untreated film conveyed to said predetermined position, said optical scanning mechanism having a light source for providing a light beam for light beam scanning;

a sub-scanning mechanism for executing sub-scanning on the untreated film light-beam-scanned by said optical scanning mechanism, in a direction intersecting the light beam scanning direction;

wherein said film separating mechanism, said optical scanning mechanism and said sub-scanning mechanism are insertable into, and removable, independently of said untreated film containing means, from said apparatus body as a unit in the same direction of insertion and removal of said untreated film containing means with respect to said apparatus body, any of said film separating mechanism, said optical scanning mechanism and said sub-scanning mechanism being insertable and removable without removing any other members in said apparatus body.

17. The apparatus according to claim 16, wherein said apparatus body has an opening for the insertion and removal of said untreated film containing means, and said film separating mechanism, said optical scanning mechanism and said sub-scanning mechanism are insertable into and removable from said apparatus body as a unit through said opening.

18. The apparatus according to claim 16, wherein said optical scanning mechanism and said sub-scanning mechanism are insertable and removable as a unit.

19. A film treating apparatus comprising:

untreated film containing means;

an apparatus body for executing treatment of untreated film at a predetermined position, said apparatus body being capable of inserting thereinto and removing therefrom said untreated film containing means containing untreated film therein; and a film separating mechanism provided in said apparatus body, said film separating mechanism separating one of the untreated films in said untreated film containing means from the rest of the untreated films and taking the one out from said untreated film containing means to convey the one to said predetermined position, said film separating mechanism being provided separately from said untreated film containing means, said film separating mechanism having a sucker for sucking the untreated films and driving mechanism for moving the sucker, wherein said film separating mechanism includes an inserting and removing opening for inserting thereinto and removing therefrom said untreated film containing means provided at an outside frame of said apparatus body, from said inserting and removing opening, said film separating mechanism capable of being inserted and removed independently of said untreated film containing means in a direction where said untreated film containing means is insertable and removable with respect to said apparatus body, said film separating mechanism being insertable and removable without removing any other members in the apparatus body.

20. A film treating apparatus comprising:

untreated film containing means;

an apparatus body for executing treatment of untreated film at a predetermined position, said apparatus body being capable of inserting thereinto and removing therefrom said untreated film containing means containing untreated film therein; and an optical scanning mechanism provided in said apparatus body, said optical scanning mechanism effecting light beam scanning for film treatment on the untreated film conveyed to said predetermined position, said optical scanning mechanism having a light source for providing a light beam for light beam scanning, wherein said optical scanning mechanism includes an inserting and removing opening for inserting thereinto and removing therefrom said untreated film containing means provided at an outside frame of said apparatus body, from said inserting and removing opening, said film separating mechanism capable of being inserted and removed independently of said untreated film containing means in a direction where said untreated film containing means is insertable and removable with respect to said apparatus body, said film separating mechanism being insertable and removable without removing any other members in the apparatus body.

21. A film treading apparatus comprising:

untreated film containing means;

an apparatus body for executing treatment of untreated film at a predetermined position, said apparatus body being capable of inserting thereinto and removing therefrom said untreated film containing means containing untreated film therein;

an optical scanning mechanism provided in said apparatus body, said optical scanning mechanism effecting light beam scanning for film treatment on the untreated film conveyed to said predetermined position said optical scanning mechanism having a light source for providing a light beam for light beam scanning;

a sub-scanning mechanism for executing sub-scanning on the untreated film light-beam-scanned by said optical scanning mechanism, in a direction intersecting the light beam scanning direction;

wherein said sub-scanning mechanism includes an inserting and removing opening for inserting thereinto and removing therefrom said untreated film containing means provided at an outside frame of said apparatus body, from said inserting and removing opening, said film separating mechanism capable of being inserted and removed independently of said untreated film containing means in a direction where said untreated film containing means is insertable and removable with respect to said apparatus body, said film separating mechanism being insertable and removable without removing any other members in the apparatus body.

* * * * *

UNITED STATES PATENT AND TRADEMARK OFFICE
CERTIFICATE OF CORRECTION

PATENT NO. : 5,986,689

DATED : November 16, 1999

INVENTOR(S) : KENICHI SUZUKI

It is certified that error appears in the above-identified patent and that said Letters Patent is hereby corrected as shown below:

COLUMN 1:

Line 4, "1 .Field" should read --1. Field--;
    Line 24, "a" should read --an--;
    Line 25, "the" should read --a--; and
    Line 41, "there" should be deleted.

COLUMN 6:

Line 32, "such" should read --suck--.

COLUMN 8:

Line 23, "removal" should read --removable--;
    Line 30, "as" should read --an--; and
    Line 31, "becomes" should read --become--;

UNITED STATES PATENT AND TRADEMARK OFFICE
CERTIFICATE OF CORRECTION

PATENT NO. : 5,986,689
DATED      : November 16, 1999
INVENTOR(S) : KENICHI SUZUKI It is certified that error appears in the above-identified patent and that said Letters Patent is hereby corrected as shown below:

COLUMN 9:

Line 46, "Further,the" should read --Further, the--.

Signed and Sealed this

Twenty-seventh Day of March, 2001

Attest:

NICHOLAS P. GODICI

Attesting Officer   Acting Director of the United States Patent and Trademark Office